United States Patent
Gudjonsson

[15] 3,696,545
[45] Oct. 10, 1972

[54] AUTOMATIC FISHING REEL

[72] Inventor: Ellidi Norddahl Gudjonsson, Lindarflot 37, Gardahreppi, Iceland

[22] Filed: June 1, 1970

[21] Appl. No.: 41,957

[52] U.S. Cl. ..................................................43/15
[51] Int. Cl. ............................................A01k 97/00
[58] Field of Search..................................43/15, 16

[56] References Cited

UNITED STATES PATENTS 1,360,429  11/1920  Michaelis...................43/15 X
2,709,867  6/1955  Routh...........................43/15

*Primary Examiner*—Samuel Koren
*Assistant Examiner*—Daniel J. Leach
*Attorney*—Flynn & Frishauf

[57] ABSTRACT

The automatic motor driven fishing reel having a lever pivotally mounted on a motor driven shaft, the lever also supporting a fishing line as it is reeled off the reel member. A steering arm is pivotally attached to the lever and a spring member is pivotally attached to the steering arm which is movable to first and second stable positions. A clutch is provided between the motor and reel member which is disengaged when the steering arm is in its first stable position and which is engaged when the steering arm is in its second stable position to interconnect the reel and motor. Upon a predetermined pull on the fishing line, when the steering arm is near, or in its second stable position, the motor is energized to reel in the fishing line.

12 Claims, 7 Drawing Figures

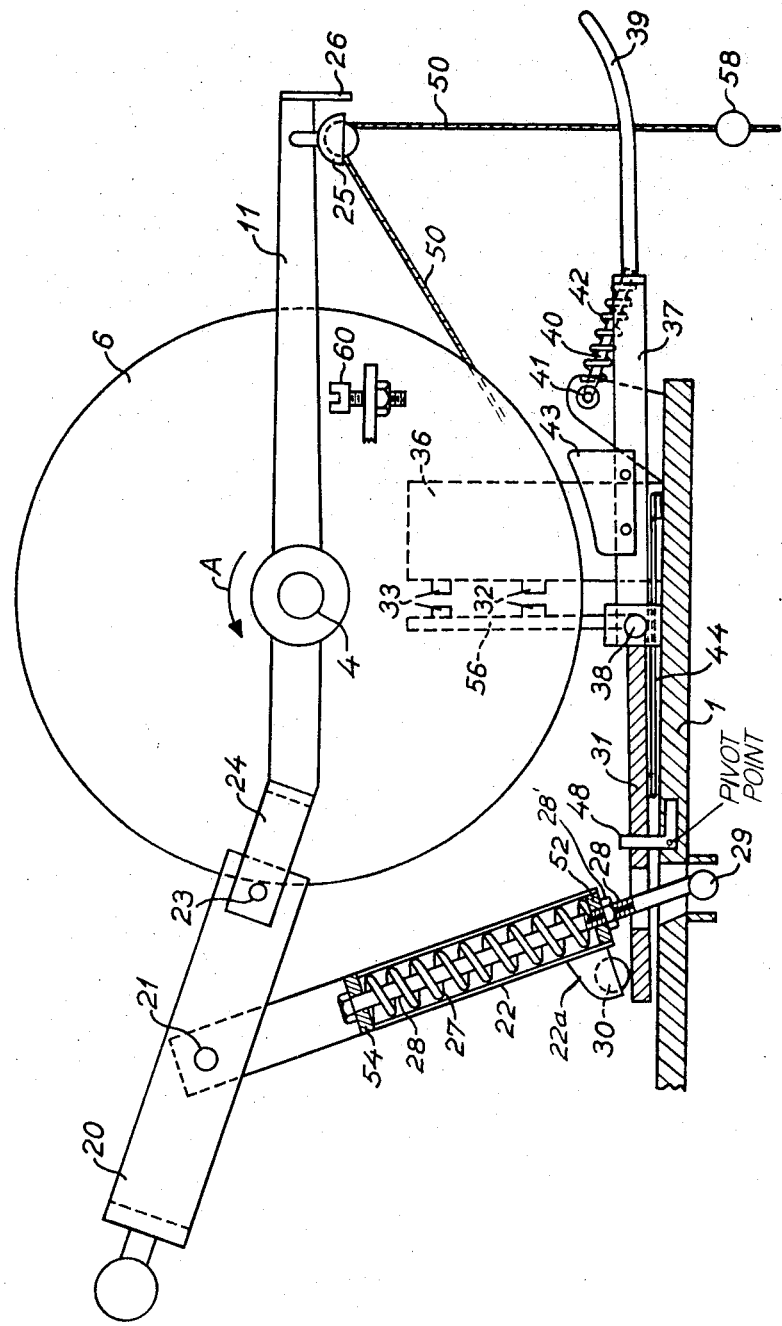

AUTOMATIC FISHING REEL

The present invention relates to an automatic fishing reel for use in the so-called hand line fishing wherein a line provided with a number of hooks is given or fed off from a reel under the influence of gravity, and after a suitable time, preferably when there is a predetermined pull upon the line, the line is automatically taken in.

It is an object of the invention to provide a fishing reel of this type which is reliable in operation and fully automatic, so that once the operator has started the device to feed or give off the line, he will not have to attend again to the device until the catch has been taken in.

Another object of the invention is to provide such a fishing reel which may be adjusted to any desired amount of pull and having a flexible clutch means which protects the motor means against excess load.

A further object of the invention is to provide such a fishing reel which stepwise increases the speed of the motor when the pull upon the line is increased.

A still further object of the invention is to provide such a fishing reel wherein the circuit to the motor is broken and the reel stopped when the line has been reeled in a predetermined amount, whereafter the catch may be removed from the line.

SUMMARY OF THE INVENTION

In accordance with the present invention, an automatic fishing reel includes a motor, a shaft coupled to the motor and a rotatable reel member coupled to the shaft and carrying a fishing line. A lever is pivotally mounted to the shaft, the lever being movable about the shaft between first and the second extreme positions. A support is provided on the lever for supporting the fishing line as it is reeled off of said reel member. A steering arm is pivotally attached to the lever at the end thereof opposite the line support. A first spring member is pivotally attached to the steering arm and is pivotally attached to a point below the steering arm whereby the steering arm has a first stable position when the lever is near or at its first extreme position, and the steering arm moves to a second stable position when the lever moves to its second extreme position. A clutch means is provided between the motor and the reel member which is disengaged when the steering arm is in its first stable position and which is engaged to drivingly interconnect the reel member and the motor when the steering arm is in its second stable position. An actuating means is operably coupled to the first spring member for energizing the motor upon a predetermined pull on said fishing line only when the steering arm is near, or in, its second stable position.

Further objects, features and advantages of the invention will be apparent from the following description taken in conjunction with the accompanying drawings, wherein:

FIG. 1 is a diagrammatic sectional side view illustrating a preferred embodiment of the fishing reel according to the invention;

Figure 1A:
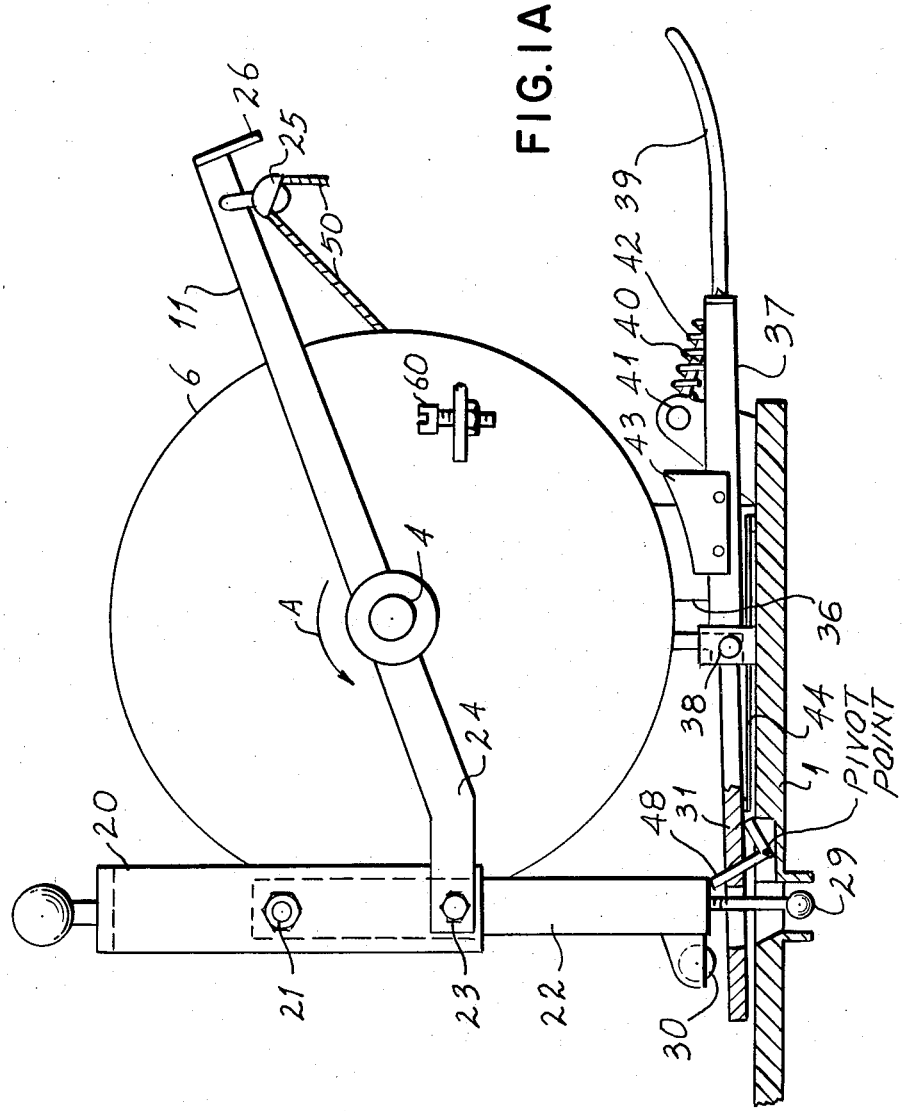
FIG. 1A illustrates the embodiment of FIG. 1 in a different operational position.
Figure 2:
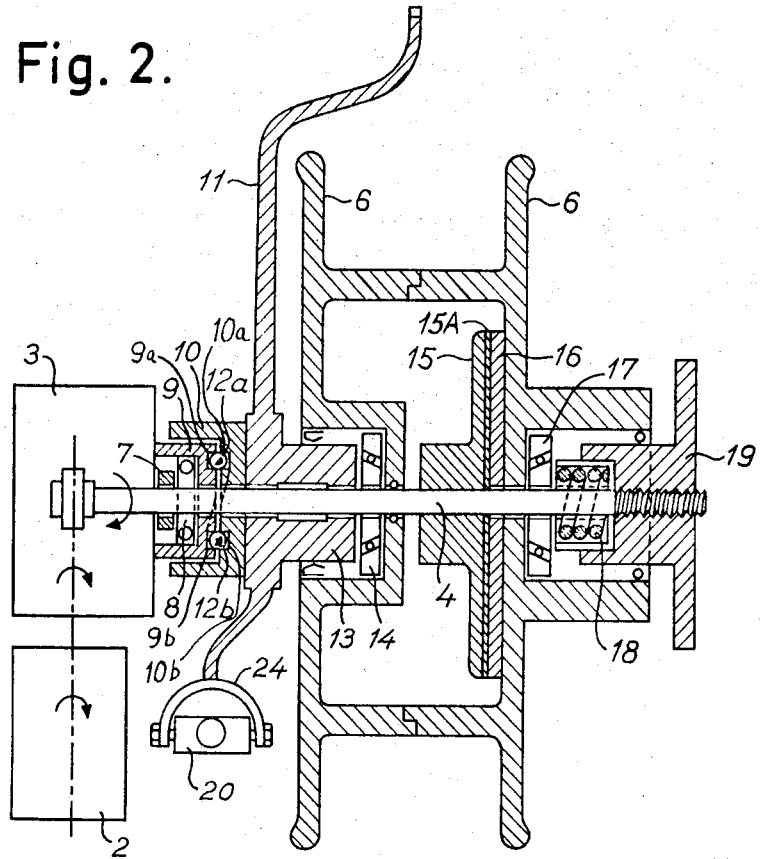
FIG. 2 is a sectional view of the preferred embodiment of the invention as viewed from above.

Referring now to FIGS. 1 and 2, an automatic fishing reel according to the present invention comprises a platform 1, which by brackets (not shown) supports the rotary shaft 4 of the reel member 6. The shaft 4 is driven by a motor means 2 via a worm gear means 3. On the housing of the worm gear means 3 there is fixed a stationary bearing housing 9, which encircles a shoulder 7 on the shaft 4. Between the shoulder 7 and the bearing housing 9 is located a thrust bearing 8. The right side of the bearing housing 9 (as seen in FIG. 2) is provided with at least two screw line grooves (i.e., grooves of gradually varying depth) 9a, 9b, which preferably each cover an arc of about 90° on diametrically opposed sides of said shaft 4. In the grooves 9a, 9b there is a corresponding number of respective balls 12a, 12b, which are also lying in corresponding screw line grooves (i.e., grooves of gradually varying depth) 10a, 10b formed in a coupling housing 10 which is rotatable on shaft 4. When the coupling housing 10 is turned counterclockwise as viewed from the left side from the position shown in FIG. 2, the balls 12a, 12b will move from a position where they are lying high in the grooves 9a, 9b, 10a, 10b (i.e., in shallow portions of the groove) to a position where they are lying deep in the grooves (i.e., in deeper portions of the grooves). Hence, the axial distance between the stationary bearing housing 9 and the coupling housing 10 will be decreased.

The right side of the coupling housing 10 (as seen in FIG. 2) is fixedly coupled to a lever 11 having a shoulder 13, and between the shoulder 13 and the reel member 6 there is a conical bearing 14. Shoulder 13 is journalled on shaft 4. Inside the hub of the reel member 6 and fixed thereto is a clutch disc 16 which cooperates with a clutch disc 15 which is fixed on the rotary shaft 4. A clutch-pad or lining 15A made of cork, asbestos, or the like, is attached to one of the clutch discs 15 or 16 as is conventional in the clutch art. On the outer side of the side wall of the reel member, to which the clutch disc 16 is fixed, there is another conical bearing 17, which faces a spring 18. The tension (or pressure) of the spring 18 may be adjusted by means of a handle 19, which is screwed on the end of the rotary shaft 4, and which engages the other end of spring 18. As handle 19 is screwed in, the pressure of spring 18 increases.

Figure 4:
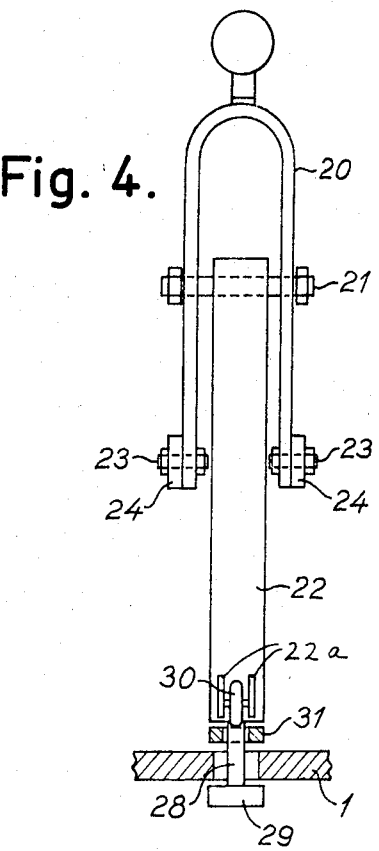
FIG. 4 is a rear view of a part of the device showing the condition when the reel is ready for taking in the line.

The lever 11 is, as shown, turnable around the shaft 4 together with the coupling housing 10, and due to the pressure exerted by the spring 18 there is a rotary force (derived from the motor 2) which tends to rotate the lever 11 in the direction as shown by the arrow A in FIG. 1. The lever 11 may be turned between two extreme positions, the lowermost position being determined by an adjustable stop means 60 (see FIG. 1). At an end of the lever 11 remote from the shaft 4 there is a pulley 25 for the line 50. Line 50 is not shown wound on reel 6 for the sake of simplicity. On the opposite side of the shaft 4 the lever 11 has an extension which is coupled to a fork member 24, which by means of pins 23 (see FIG. 4) is pivotally attached to a steering arm 20. A spring member 22, 27, 28 is at its one end pivotally connected to the steering arm 20 by a pin 21, and at its other end is fixed to a bar 29 lying below the platform 1 in such a way that the spring member 22, 27, 28 can swing in a plane substantially perpendicular to the platform 1. The spring member comprises a cylindrical housing 22, which houses a compression spring 27. One end of spring 27 bears on a plate 54 and the opposite end of the spring 27 bears on the bottom 52 of the cylindrical housing 22. A spring bolt 28 passes through plate 54, through spring 27 and then goes through a hole in the bottom 52 and is rigidly connected to the bar 29 to provide a rigid connection between the bar 29 and the plate 54. The tension of the spring member may be adjusted by means of a nut 28' threaded on the bolt 28.

On the lower end of the cylindrical housing 22 there is fixed a bracket 22a carrying a steadying rotatable wheel 30. Wheel 30, due to the tension force from the spring member 22, 27, 28, is pressed against an elongated plate 31, which itself is pivotally mounted around a shaft 38 supported by the platform 1. Near the shaft 38 the plate 31 is provided with an angular actuating element 56 which, upon turning of the plate 31 about shaft 38, closes switches 32 and 33. These switches activate relays 34 and 35 (see FIG. 6) in the relay housing 36, whereby the motor 2 is energized.

Figure 5:
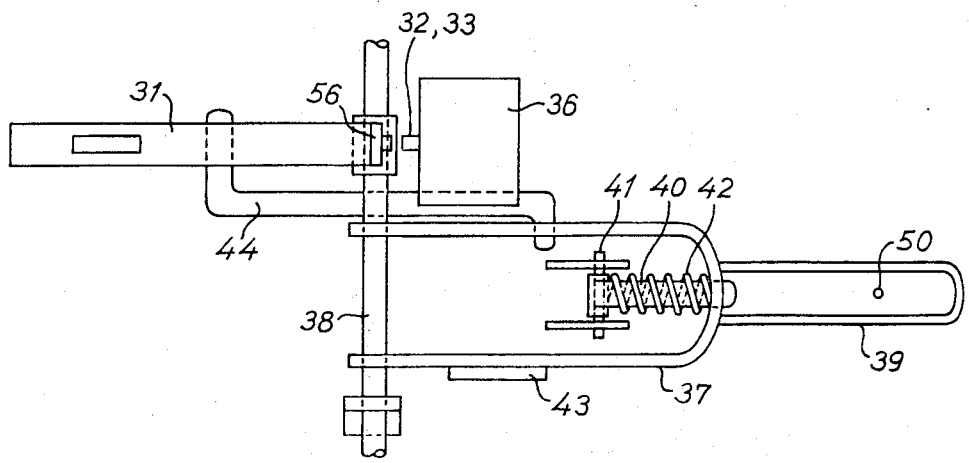
FIG. 5 is an embodiment of a means for breaking the circuit to the motor.

Between the plate 31 and the platform 1 there is, as best seen in FIG. 5, a Z-shaped spring 44 which faces the lower side of the plate 31 at one end thereof and tends to turn the plate 31 together with its actuating member 56 clockwise. The central part of the Z-shaped spring 44 is supported on the platform 1 below the shaft 38. The other end of the spring 44 faces the lower side of one leg of a fork member 37. This fork member 37 has its legs pivotally mounted on the shaft 38. Opposite the shaft 38 a compression spring 42 is attached to the fork member 37 by means of a rod 40. The rod 40 is pivotally mounted on a shaft 41 which is supported by means of brackets on the platform 1. The fork member 37 may assume a first stable position as shown in FIG. 1, and also a second stable position, where the spring 42 with its bar 40 points up to the right (referring to FIG. 1). A guiding means 39 for the line 50 extends from the fork member 37. When a pressure is exerted from below on the guiding member 39, the fork member 37 will move to its second stable position mentioned above, whereby the Z-shaped spring 44 will no longer exert a rotational force on the plate 31 since fork member 37 no longer presses down on spring 44.

Figure 3:
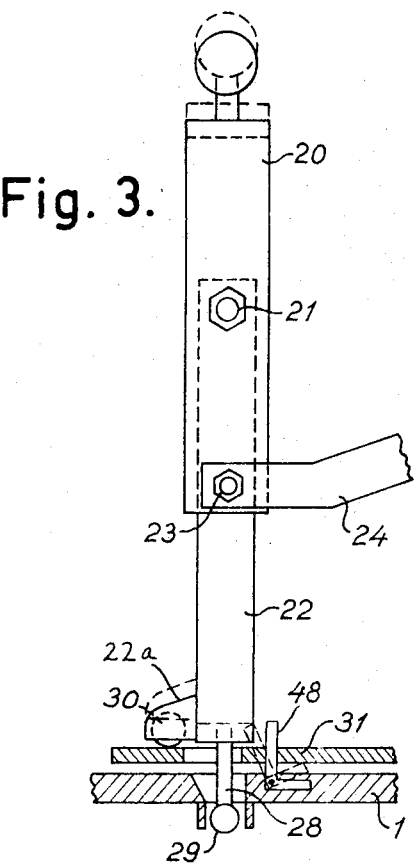
FIG. 3 is a side view of a part of the device showing the condition when the reel is ready for taking in the line and showing in dashed lines a simplified representation of a second position of the device corresponding to the position shown in FIG. 1A.

The fishing reel according to the invention operates in its preferred embodiment substantially in the following way:

With the steering arm 20 in the position shown in FIG. 1, the line 50 is given or fed off from the reel 6. Since the line 50 with its hooks and lead (or other weight means) exerts a clockwise rotational force on the lever 11 (see FIG. 1), lever 11 will turn about shaft 4 until it hits the adjustable stop means 60. The clutch discs 15 and 16 will then be spaced from each other (FIG. 2 shows clutch discs 15 and 16 engaged), since the balls 12a, 12b are now riding high (in the shallow portions) in grooves 9a, 9b, 10a, 10b, and the movement of lever 11 will have pushed the reel 6 to the right, as viewed in FIG. 2, and the reel member 6 can rotate freely and give off the line under the influence of gravitational forces on the line. When the lead or other weight means hits the sea bottom, the downward force on the lever 11 is reduced, and due to the rotary force exerted by the spring 18 and the balls 12a, 12b which tend to roll to the deeper portion of the grooves, which rotary force exceeds the now reduced force on lever 11, the lever 11 will turn in the counterclockwise direction shown by the arrow A in FIG. 1 to the position indicated in FIG. 1A and by dashed lines in FIG. 3. Then, the fork means 24 turns the steering arm 20 about the pin 21, and the steering arm 20 will together with the spring system 22, 27, 28 move to the position shown in FIGS. 3 and 4. This is the second stable position of lever 11 and of spring member 22, 27 and 28. Simultaneously, the turning of the lever 11 and the moving of the balls 12a, 12b in the above-mentioned grooves 9a, 9b, 10a, 10b, causes the distance between the coupling housing 10 and the stationary bearing housing 9 to be decreased. The spring 18 moves the reel member 6 with its clutch disc 16 axially to the left in FIG. 2, until it is drivingly engaged with the clutch disc 15. In this position the fishing reel is ready to take in the line, when the motor means 2 receives a signal to start.

If desired, the motor means 2 may be energized at once when a turnable stop means 48 is in the position shown in FIG. 1. The housing 22 will stop, as shown in FIG. 1A and by dashed lines in FIG. 3, when it hits the stop means 48 — the lower end of housing 22 will bear on the upper part of stop means 48, thereby allowing spring 44 to bias plate 31 upward to active the switch 32 to energize motor 2 at low speed. The pull on the spring member 22, 27, 28 from the steering arm 20 will reduce the pressure of the wheel 30 on the plate 31, whereby the switch 33 will additionally be activated. When the stop means 48 is in the position of FIG. 3 (solid lines) where it does not restrict the movement of the spring means 22, 27, 28, the steering arm 20 will move to its second stable position as described above, and the switches 32 and 33 will remain unactivated until the appropriate forces are applied. The provision of such a stop means 48 is optional.

Figure 6:
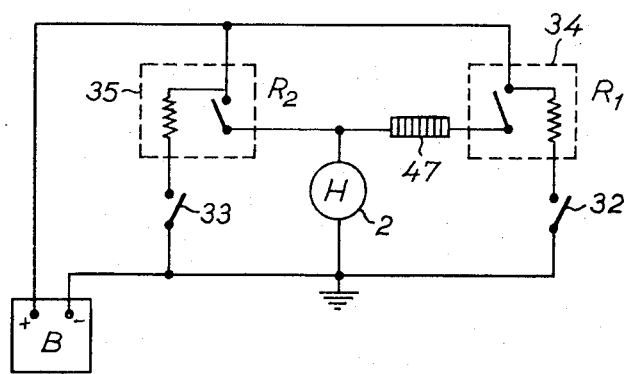
FIG. 6 is a schematic diagram of the electrical portions of the device of the invention.

When a pull of a certain amount is exerted on the line 50, when steering arm 20 is in its second stable position (FIGS. 3 and 4) the lever 11 will turn clockwise opposite the arrow A in FIG. 1 with the spring means 22,27,28 remaining in its second stable position, and the pressure of the wheel 30 on the plate 31 is decreased. The amount of pull on the line required to turn lever 11 clockwise when the steering arm 20 is in its second stable position (FIG. 3 and 4) is adjusted by varying the compression of spring 27 via nut 28'. Due to the Z-shaped spring 44 exerting an upward force on the left end of plate 31, the plate 31 with its angular actuating member 56 will pivot about pivot 38 and switch on the switch 32 to start the motor means 2 to operate with, for example, half speed (FIG. 6). When the pull on the line 50 is increased, the lever 11 will rotate further clockwise to also switch on the switch 33, whereby the resistance 47 (FIG. 6) will be short-circuited and the motor means 2 will operate with maximum speed. If the pull on line 50 is then decreased, lever 11 tends to move counterclockwise in FIG. 1 and the motor speed will be reduced or the motor stopped.

This operation is continued until the stopper ball 58 on the line 50 hits the guiding means 39. The continued hauling of the line by line means of the motor means 2 causes the fork member 37 to move upward from the position shown in FIG. 1 to its second stable position as explained hereinabove. The rotational effect of the Z-shaped spring 44 on the plate 31 is then removed, and the circuit to the motor will be broken due to the opening of switches 32 and 33 caused by the falling plate 31 due to gravity. Simultaneously, a brake member 43 carried by the fork member 37 comes in contact with the reel member 6 and causes the reel 6 to stop its rotation. Hereafter the catch may be secured.

When the operator wishes to perform a subsequent stoke-hauling movement of the line, this may be done by setting the steering arm 20 in its first stable position as shown in FIG. 1, whereby the reel member 6 is again freely rotatable and the above sequence of events will be appropriately repeated.

The automatic reel mechanism is adjusted for different strength lines 50 substantially by handle 19 to prevent breakage of the line during a hauling in operation.

Although the invention has been described in connection with a preferred embodiment, it will be obvious to those skilled in the art that various changes may be made in the invention without departing from the spirit and scope thereof, and the invention is intended to cover all suitable modifications, which fall within the scope of the appended claims.

I claim:
1. An automatic fishing reel comprising:
 a motor means 2;
 a shaft 4 coupled to said motor means 2;
 a rotatable reel member 6 coupled to said shaft 4;
 a lever 11 pivotally mounted on said shaft 4, said lever 11 being movable about said shaft 4 between first and second extreme positions;
 a line 50 attached to said reel member 6;
 a support 25 on said lever 11 for supporting said line 50;
 a steering arm 20 pivotally attached to a portion 24 of said lever 11 which extends on the side of said shaft 4 opposite said support 25;
 a first spring member 22, 27, 28 pivotally attached at one end to said steering arm 20 and at its other end pivotally attached to a point 29 below said steering arm 20, said steering arm 20 having a first stable position when said lever 11 is near or at its first extreme position, and said steering arm 20 moving to a second stable position when said lever 11 moves to its second extreme position;
 a clutch means 15, 16 coupled between said motor means 2 and said reel member 6, said clutch means 15, 16 being in an inoperative, or disengaged, position when said steering arm 20 is in its said first stable position, and said clutch means 15, 16 being in an operative, or engaged, position to drivingly interconnect said reel member 6 and said motor means 2 when said steering arm 20 is in its said second stable position; and an actuating means 30, 31, 32, 33, 44, 56 operably coupled to said first spring member 22, 27, 28 for energizing said motor means 2 upon a predetermined pull on said line 50 only when said steering arm 20 is near, or in, its second stable position.

2. The combination of claim 1 wherein said first spring member comprises:
 a housing 22 pivotally attached to said steering arm 20;
 a compression spring 27 in said housing 22; and
 a spring bolt 28 extending through said spring 27 and through an opening in the bottom of said housing 22, said spring bolt 28 being connected to said point 29.

3. The combination of claim 2 wherein said spring bolt 28 adjustably varies the compression of said spring 27 to vary the predetermined pull required to energize said motor means 2.

4. The combination of claim 1 comprising a platform 1 on which said automatic fishing reel is mounted.

5. The combination of claim 4 wherein said actuating means includes:
 a plate means 31 pivotally mounted 38 to said platform 1;
 a wheel 30 rotatably mounted at the lower end of said housing 22, said wheel 30 being rollable on said pivotal plate means 31;
 an actuating element 56 coupled to said plate 31;
 a second spring member 44 which tends to rotate said plate 31 about its pivotal mounting; and
 switch means 32, 33 actuated by said actuating element 56 for selectively operating said motor means 2 when said plate 31 is caused to rotate about its pivotal mounting under the influence of said second spring means 44 and when said predetermined pull is applied to said line, the steering arm 20 being at or near its second stable position.

6. The combination of claim 5 further comprising a fork member 37 pivotally coupled 38 to said platform 1 and being movable between the first and second stable position, and wherein said second spring member 44 is an elongated spring 44 which at its one end faces the lower side of said plate 31 and at its other end faces the lower end of said fork member 37, said elongated spring 44 applying said rotational force to said plate 31 when said fork member 37 is in its first stable position wherein it bears on said elongated spring, and said elongated spring applying no force to said plate 31 when said fork member 37 is in its second stable position wherein it does not bear on said elongated spring 37.

7. The combination of claim 6 wherein said elongated spring 44 is a Z-shaped spring.

8. The combination of claim 6 wherein said fork member 37 is normally in its first stable position and moves to its second stable position when the line 50 is reeled in.

9. The combination of claim 6 comprising brake means 43 coupled to said fork member 37 which, by movement of said fork member 37 to its said second stable position brakes the reel member when the line 50 is reeled in.

10. The combination of claim 1 comprising a stop means 60 for defining said first extreme position of said lever 11.

11. The combination according to claim 1 wherein said reel member 6 is rotatably mounted on said shaft 4 and wherein said clutch means comprises:
- a clutch housing 10 fixedly coupled to said lever 11 and which together with said lever 11 is rotatable about said rotary shaft 4;
- variable depth grooves in said clutch housing, each groove receiving at least one ball;
- a stationary bearing housing 9 mounted about said shaft 4 and having variable depth grooves therein, each groove receiving at least one of said balls and cooperating with said clutch housing 10;
- a first clutch disc 15 fixedly coupled on said rotary shaft 4;
- a second clutch disc 16 fixedly coupled on said reel member 6;
- a third spring member 18 biasing said reel member 6 and said second clutch disc 16 towards said first clutch disc 15;
- said two clutch discs 15, 16 being spaced apart from each other when said balls are lying high in said grooves, and said two clutch discs 15, 16 being drivingly connected to each other when said balls are lying deep in said grooves.

12. The combination of claim 11 comprising means 19 for adjusting the biasing force of said third spring member 18.

* * * * *